United States Patent
Casati et al.

(10) Patent No.: US 8,291,061 B2
(45) Date of Patent: Oct. 16, 2012

(54) METHOD AND SYSTEM FOR BUSINESS-ORIENTED WEB SERVICES MANAGEMENT

(75) Inventors: Fabio Casati, Palo Alto, CA (US); Ming-Chien Shan, Saratoga, CA (US); Umeshwar Dayal, Saratoga, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2869 days.

(21) Appl. No.: 10/681,782

(22) Filed: Oct. 8, 2003

(65) Prior Publication Data

US 2005/0080661 A1    Apr. 14, 2005

(51) Int. Cl.
*G06F 15/173* (2006.01)
*G06F 15/16* (2006.01)
*G06F 17/00* (2006.01)
*G06F 13/00* (2006.01)
*G06F 3/00* (2006.01)

(52) U.S. Cl. ......... 709/224; 709/203; 715/234; 719/330

(58) Field of Classification Search .................. 709/203, 709/224; 715/234; 719/330
See application file for complete search history.

(56) References Cited

U.S. PATENT DOCUMENTS

| | | | | |
|---|---|---|---|---|
| 6,789,046 | B1 * | 9/2004 | Murstein et al. | 702/182 |
| 6,792,460 | B2 * | 9/2004 | Oulu et al. | 709/224 |
| 6,975,963 | B2 * | 12/2005 | Hamilton et al. | 702/182 |
| 6,993,454 | B1 * | 1/2006 | Murstein et al. | 702/182 |
| 7,051,098 | B2 * | 5/2006 | Masters et al. | 709/224 |
| 7,110,843 | B2 * | 9/2006 | Pagnano et al. | 700/108 |
| 7,197,559 | B2 * | 3/2007 | Goldstein et al. | 709/224 |
| 7,392,321 | B1 * | 6/2008 | Wolf et al. | 709/232 |
| 7,401,143 | B2 * | 7/2008 | Oulu et al. | 709/224 |
| 7,480,647 | B1 * | 1/2009 | Murstein et al. | 707/3 |
| 7,831,693 | B2 * | 11/2010 | Lai | 709/220 |
| 2002/0120727 | A1 * | 8/2002 | Curley et al. | 709/223 |
| 2002/0198985 | A1 * | 12/2002 | Fraenkel et al. | 709/224 |
| 2004/0059810 | A1 * | 3/2004 | Chess et al. | 709/224 |
| 2006/0053290 | A1 * | 3/2006 | Randle et al. | 713/169 |
| 2006/0107036 | A1 * | 5/2006 | Randle et al. | 713/153 |

* cited by examiner

*Primary Examiner* — George C Neurauter

(57) ABSTRACT

A method and system are disclosed for monitoring the performance of web-based services. The method comprises receiving a transaction from a client and routing the transaction to an appropriate web service for execution of the transaction. During execution of the transaction, performance data relating to the execution of the transaction is monitored and logged. The collected performance data is then queried based on pre-defined performance metrics and web service performance reports are generated. A system for the foregoing method is also disclosed.

24 Claims, 3 Drawing Sheets

METHOD AND SYSTEM FOR BUSINESS-ORIENTED WEB SERVICES MANAGEMENT

BACKGROUND

Business organizations may use a multitude of computing systems, both internal and external to the business, for carrying out business processes (e.g., order processing, product delivery scheduling). A single business process may be carried out by various services, which may involve many types of computer systems, software applications or computing platforms. For example, a network terminal may serve as a first service for confirming receipt of an order. In the next step in the business process, a server may use a software package to query a datastore to determine if the order can be filled. A web page may serve as a third type of application for entering and tracking order specifics. Similarly, several other types of services may be required to complete the business process. Managing the performance of the business services may contribute to maintaining an efficient, profitable business.

Business-oriented management of web-based services may refer to the problem of understanding the impact of web-based services execution from a business perspective, and additionally, of correcting and optimizing web-based service executions based on business objectives. Addressing this issue may provide alignment between information technology (IT) operations and business goals. There may be an increasing need for closely controlling the IT infrastructure based on business needs. For example, a web-based service could offer operations that allow clients to order goods and request their delivery. The quality of the web-based service executions may have a direct effect on the quality of the business transactions, as well as on the relationships between clients and service providers. Consequently, it is desirable to monitor the services in a holistic manner that is meaningful to a business user.

Monitoring the execution of web-based services is closely related to monitoring business interactions with partners. Accordingly, the Service Level Agreements (SLA) stipulated by the service provider with the interacting party pose constraints on how web-based services should operate to meet the SLA's. Business-oriented management of web-based services exploits this link, using business metrics as the criteria based on which web-based services are be monitored and controlled. Business-oriented management may be achieved by collecting and analyzing Simple Object Access Protocol (SOAP) messages to provide business-meaningful metrics. For example, a company that may provide a web-based service allowing clients to purchase PCs, and also may provide an operation called order( ) as part of its Web Services Description Language (WSDL) interface. A business manager may consider a purchase transaction with a client to be successful if the order( ) operation returns in less than 30 seconds and has an output result of "accept". If this information can be determined from the logged SOAP data, then it may be possible to determine historic success rates by querying such data.

While this approach may be viable, it may have many severe limitations. Specifically, it may require a large development and maintenance effort to implement the code-mapping execution data into business metrics, and it may suffer from performance problems whenever a large number of real-time reports are needed. However, the most severe limitation may be the lack of support for a holistic view of the interactions that occur through web-based services.

It may be desirable to obtain a complete picture of the external quality of the interactions, as perceived by the clients, and its relationships with the way services are executed internally. Further, it may be desirable to facilitate the rapid creation of custom metrics, without the need for intensive coding by the business user.

SUMMARY

A method and system are disclosed for monitoring the performance of web-based services. The method comprises receiving a transaction from a client and routing the transaction to an appropriate web service for execution of the transaction. During execution of the transaction, performance data relating to the execution of the transaction is monitored and logged. The collected performance data is then queried based on pre-defined performance metrics and web service performance reports are generated. A system for the foregoing method is also disclosed.

BRIEF DESCRIPTION OF THE DRAWINGS

For a detailed description of the embodiments of the invention, reference will now be made to the accompanying drawings in which.

NOTATION AND NOMENCLATURE

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . "

The term "computer" is intended to mean a computing entity, which may be a server, terminal, personal or other computer, or a network of computing entities working together as a unit. The term "datastore" refers to a computing entity housing a collection of data organized for search and retrieval, such as relational databases, directory services, or in some instances even some types of defined or open format text files. The term "network" encompasses any of the various pathways computers or systems may use for communication with each other including Ethernet, token-ring, wireless networks, or the internet. The term "service" refers to one or more linked computing entities. The term "application" refers to an executable software package or program that can be run on a computing entity. The term "transaction" refers to an interaction between two computing entities, and more particularly, in a message-based event or command. The term "composition" refers to a set of transactions specific to the web services manager. The term "conversation" refers to a set of transactions between a client, or customer, and a composite web service.

DETAILED DESCRIPTION

The following discussion is directed to various embodiments of the invention. Although one or more of these embodiments may be preferred, the embodiments disclosed should not be interpreted, or otherwise used, as limiting the scope of the disclosure. In addition, one skilled in the art will understand that the following description has broad application, and the discussion of any embodiment is meant only to be exemplary of that embodiment, and not intended to intimate that the scope of the disclosure is limited to that embodiment.

Figure 1:
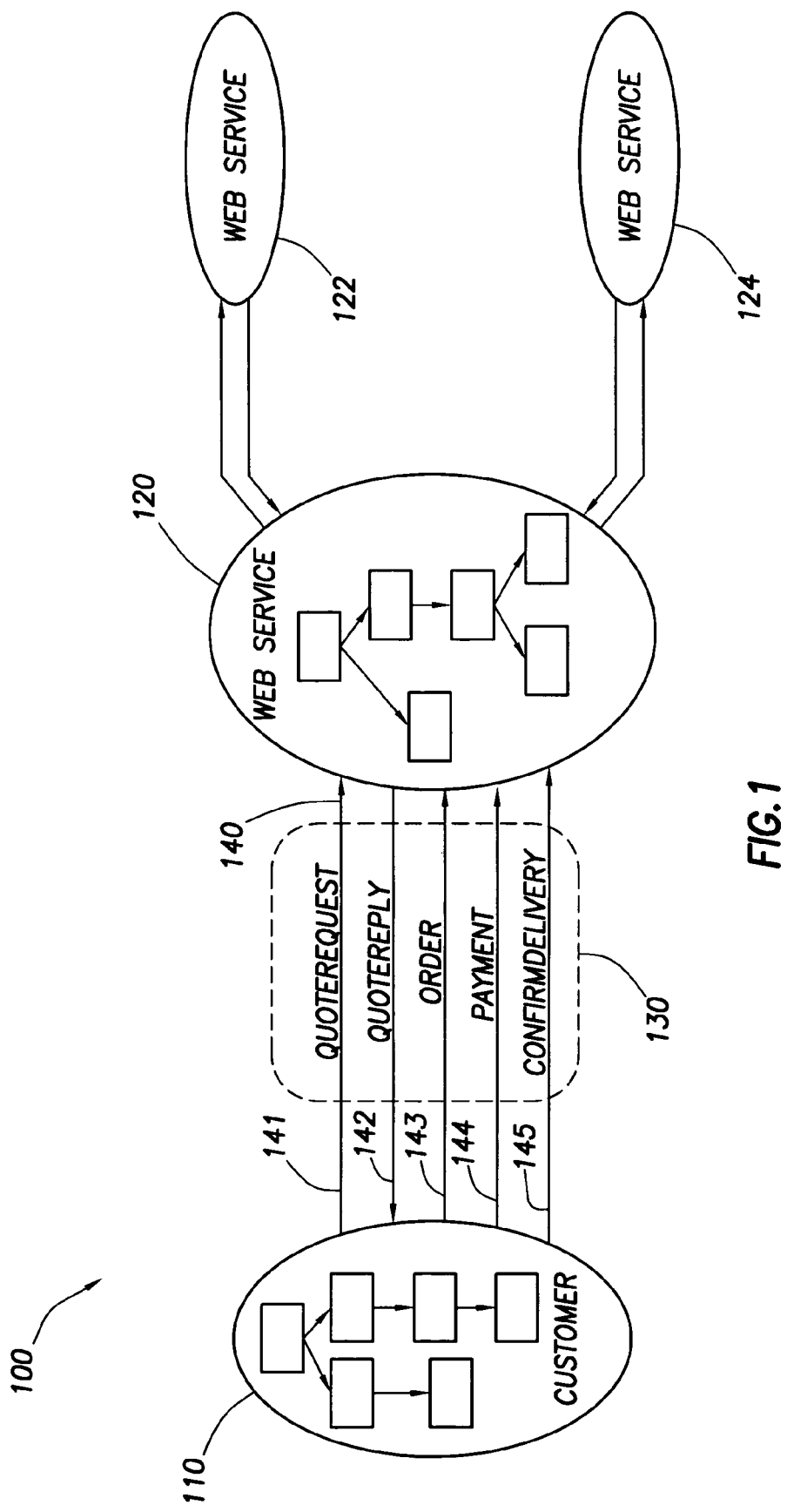
FIG. 1 illustrates a conceptual web service configuration in accordance with embodiments of the invention.

FIG. 1 illustrates a conceptual web service configuration 100, according to some embodiments. A client 110 may access a web service 120 from a program interface. The web service 120 may be a set of programs made available through the web. The web service 120 may provide a multitude of functions for carrying out a business process (e.g., a sale or order) for the client 110, which may be a user within the business or an external customer. Web service 120 may be a composite web service, drawing information and interacting with other potentially external web services 122, 124, yet presenting responses to the client 110 through a single interface.

The client 110 may conduct an electronic conversation 130 with the web service 120. The conversation 130 may comprise a plurality of exchanged messages 141-145, the expected order and content of which may be defined by means of a conversation definition language. As an example, conversations can be described using the Web Services Conversation Language (WSCL) or using the Business Process Execution Language (BPEL). In an exemplary interaction, a client 110 may send a quote request message 141 to the web service 120. The web service 120 may reply with a quote reply message 142. If the quote is reasonable, the client 110 may choose to proceed with the order by sending an order message 143, followed by a payment message 144 and a message 145 confirming delivery details, such as an address. Interactions between the client 110 and the web service 120 may be on a program-to-program basis. Conversation specifications may be advertised and made available to users, so that they are aware of how to correctly interact with the web service. Further, a business user may define metric benchmark values, and may use client inputs to set appropriate benchmarks.

In contrast to conversations, the internal implementation of a Web service may be private. The way a service is implemented may not be disclosed to clients who, in principle, may be unaware of whether the service is a composite service. If the service is a composite service, then its implementation may leverage service composition technologies. This may mean that the internal logic of the web service may be specified by way of a service composition language (e.g., BPEL), and its execution may be supported by a service composition engine.

Figure 2:
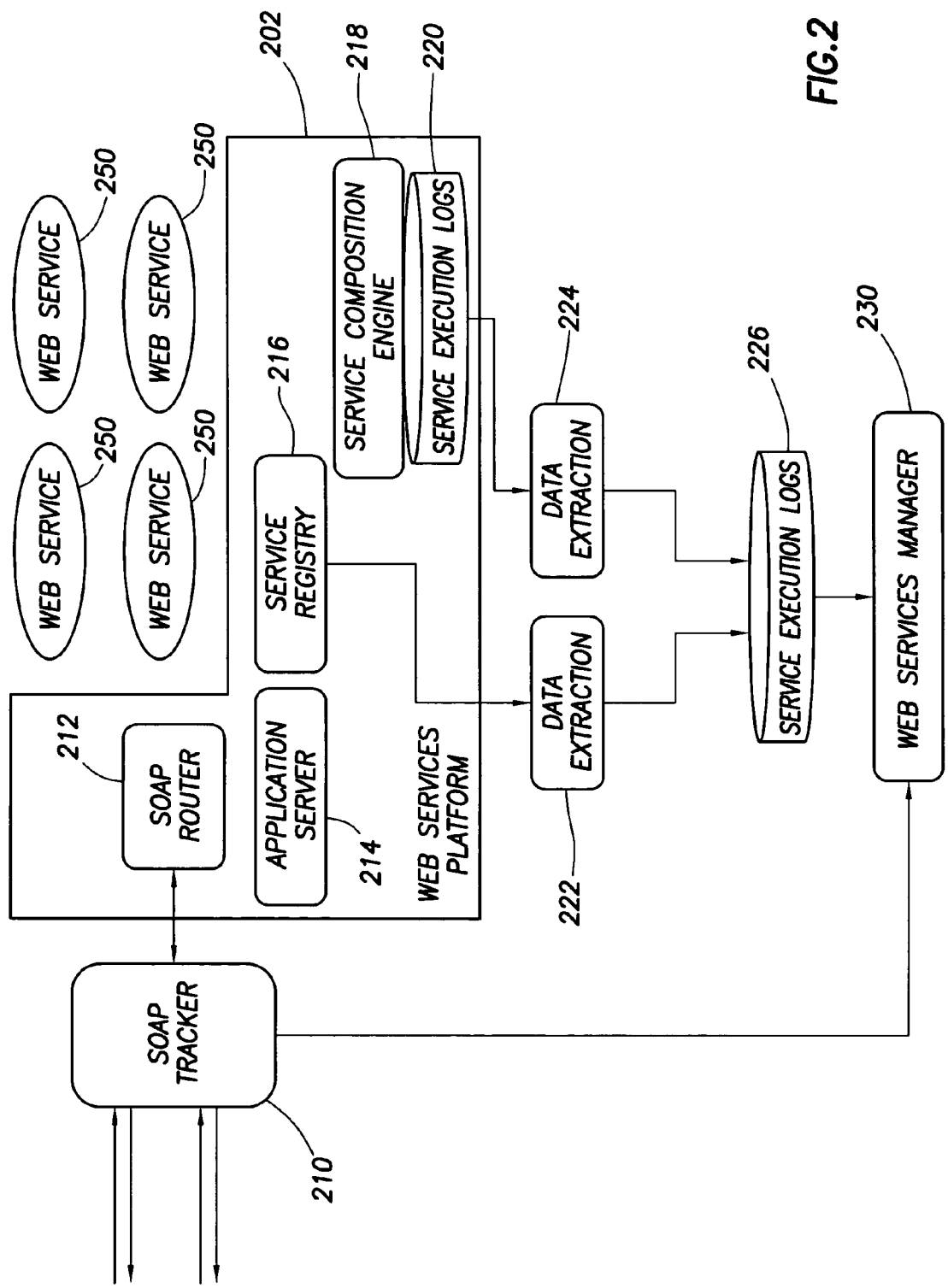
FIG. 2 illustrates a web-services management model in accordance with embodiments of the invention.

FIG. 2 illustrates an embodiment of the web-services management model 200, which may comprise components for conducting interactions between web services and a client. A Simple Object Access Protocol (SOAP) tracker 210 may log messages, information regarding who sent the messages, when the messages were sent, and with which parameters. A SOAP router 212 may accept messages coming from the client and determine the internal application (e.g., a web service 250) to which the messages should be directed. Application server 214 may aid in development and implementation of the web services 250. The application server 214 may comprise workload-balancing features, and data recovery and data translation features, including parsing and data extraction between languages. Application server 214 may also comprise a service composition engine 218.

Service registry 216 may contain definitions of services offered to a client, definitions of conversations, and a listing of services provided. Service composition engine 218 may be an internal component that executes a business process, e.g., calling other web services 250 as needed, as specified by the composition logic. Service execution logs 220 may record execution data from the composition engine 218. Data extraction component 222 may acquire data, such as the definition of a web service's interface and conversation specification, from the service registry 216, extracting it into the service execution logs 226. Data extraction component 224 may have a similar function, pulling data from the service composition engine 218 and extracting it into the service execution logs 226, which the web services manager (WSM) 230 may use as a basis for analysis.

The WSM 230 therefore may have access to data about a conversation from the service registry 216, as well as data about compositions from the service composition engine 218. SOAP router 212, application server 214, service registry 216, service composition engine 218 and service execution logs 220 may be grouped together as components that facilitate and support the definition and execution of web services, and consequently, collectively form a web services platform 202.

Figure 3:
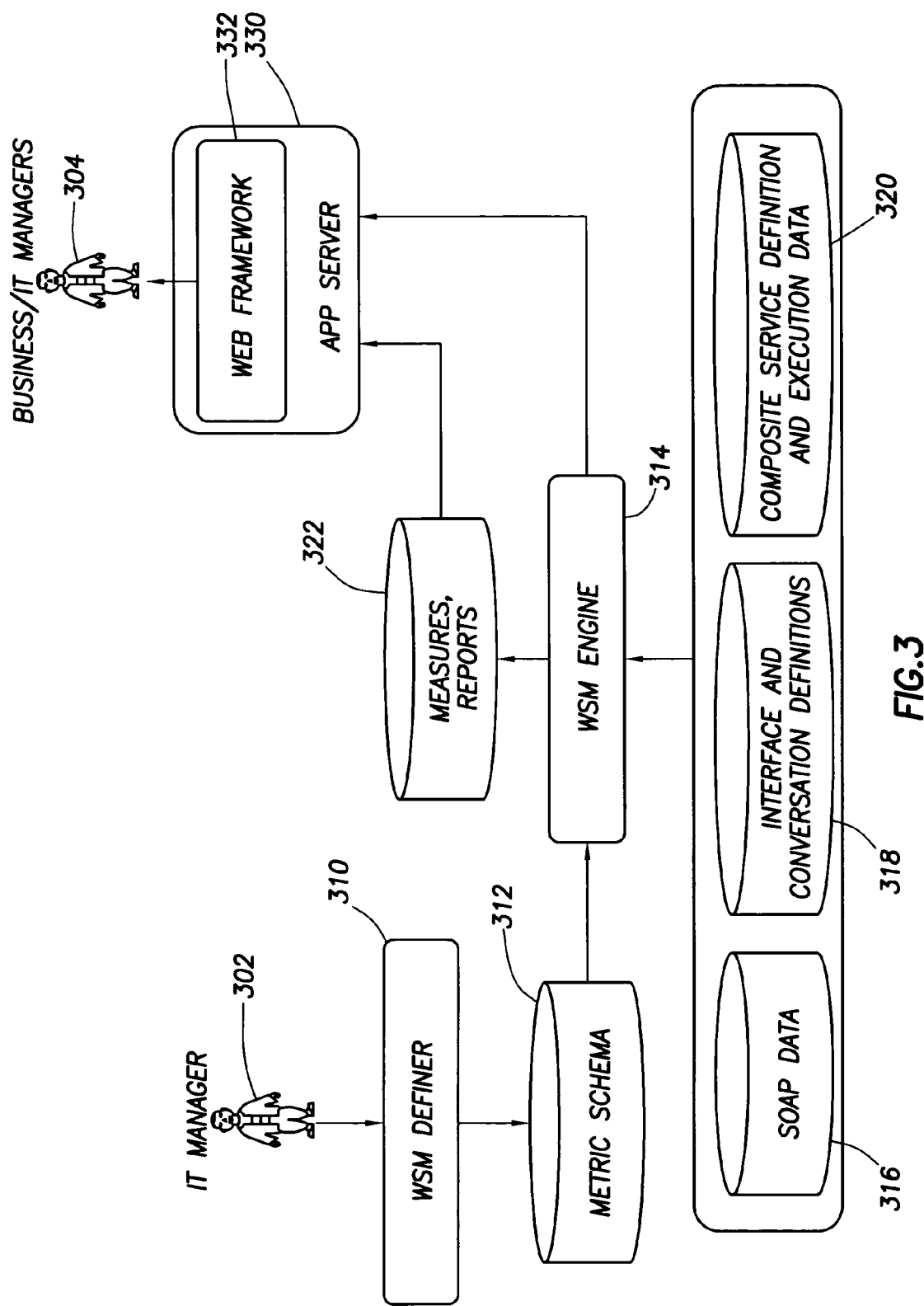
FIG. 3 illustrates the web services manager of FIG. 2 in accordance with embodiments of the invention.

The WSM 230 of FIG. 2 may be illustrated in greater detail in FIG. 3, which illustrates how the WSM may present data to a business user 304 via a web framework 332. WSM components may comprise the WSM definer 310, the WSM engine 314, and the web framework 332. An IT manager 302 may use a WSM definer 310 to define certain metrics, which are parameters to measure during execution of the business process, and may correspond to properties of web services and their executions that may be of interest to analysts. Typical metrics may include execution times, cost, and service availability.

The WSM definer 310 may be linked to a metric schema 312, which may store the metric definitions as well as their implementation (i.e., how metrics are to be computed based on service execution data). For example, a user could define a metric "performance," used to classify service executions into categories "acceptable" and "unacceptable." The user could also define that a processing time of less than 5 seconds is acceptable, while more than 5 seconds is unacceptable. Similarly, a user could define a metric called "violation of service level agreement (SLA)," to measure whether a service execution failed to meet certain service-level guarantees stipulated with the client. The implementation of this metric may depend on how such guarantees are defined.

The implementation of metrics may be based on the conversation specification. For example, an SLA may require that the time between the execution of two operations within a certain conversation be less then a specified time interval. If a service execution exceeded that time, this would later be reported as failing to meet the SLA of the particular execution. The stored metrics definitions allow for the definition of custom metrics, in a way that is useful to a business user. The implementation of the metric may be a function defined with assistance from data formatting known to be present in the service execution logs.

Embodiments of the invention may allow a user to define a metric without coding by using a metrics construction model and various functions from the metrics library. For example, the WSM of at least some embodiments may comprise a built-in function that computes whether the time between the execution of two operations O1 and O2 in the same conversation is greater than a threshold T. This function may be used to define a variety of metrics, such as the example described above and related to SLA's. By pre-building such functions into the WSM, users do not have to write code when defining a new metric. A user can merely specify that a metric implementation uses a certain built-in function with certain parameters. The metrics construction model may include an algorithm or coding that facilitates the construction of a custom metric from one or more functions and one or more parameters. For instance, on a web-based interface, a business user may be able to select desired function(s) and parameter(s) from an onscreen menu. The metrics construction model could then assemble a metric based on the choices and then report values associated with the metric, based on historical data.

The provision of readily usable built-in functions may be because the WSM assumes that the service execution logs contain certain information structured in a certain way. Specifically, some embodiments assume that the information in the service execution logs comprises service interface definitions specified in WSDL, and conversation definitions and service compositions specified in BPEL. These embodiments may further assume that messages are exchanged using the SOAP conventions. Since the service execution logs data model may be known, it may be possible to write functions that access the logs and compute metric values from stored performance data. The service execution logs may store performance data, such as service availability, maintenance costs, and time to complete a transaction, in a format such that the web services manager can easily extract relevant data. The functions can be reused by a variety of metrics, so that when users define a new metric, they do not have to write code, but can just use a function from the built-in library. For example, a user may construct a custom metric by selecting one or more functions from the function library, assigning a set of parameters and relying on the metrics construction model to generate a custom metric from these components. A function from the function library may be used multiple times to construct a number of custom metrics.

Referring again to FIG. 3, the WSM engine 314 may be a runtime component that receives inputs from the metric schema 312, as well SOAP data 316, interface and conversation definitions 318, and composition service definition and execution data 320. The WSM engine 314 may periodically read the metric definitions and data from the input components 316, 318, 320. The WSM engine 314 may then apply the metric implementation functions to the data contained in the service execution logs to produce on output to the measures and reports component 322. The measures and reports component 322 may serve to package the output of the WSM engine 314 into reports that are viewable on a web framework 332 that may be hosted by an application server 330. In some embodiments, measures and reports (e.g., whether a service execution has violated an SLA) may be stored in a relational database. As such, they can be accessed with reporting tools to provide users with charts and statistics on the computed measures.

In at least some embodiments, the functionality of the composite web service, as well as each message in a conversation, can be monitored and measured, since the WSM has knowledge of the data model of the service execution logs. As explained above, high-level metrics, such as cost and quality, can be defined and monitored. The web framework 332 may allow access to the reports by means of an ordinary web browser. A WSM user may make reports on the computed measures available to other users via a web browser. To make this possible, the WSM may comprise a Java object that receives input and the name of a user-defined metric and return images (e.g., in GIF format) showing charts that provide statistics on the particular metric.

Exemplary reported statistics may include averages, maximums, minimums, and standard deviations. Images in GIF format may be embedded in a web page. Consequently, it is possible to develop web pages that display the results as computed by WSM. By viewing the information presented on the web framework 332, a business user, such as a business or IT manager 304, can quickly assess the status and performance of messages within a conversation, as well as interactions between the various web service management components and systems. It will be understood that the components disclosed in FIGS. 2 and 3 may comprise computing hardware, software applications stored on a readable storage medium and/or coding scripts for running within a software application instance.

Metrics regarding conversations and compositions can be defined and correlated. As previously mentioned, a service interacts with client applications according to a conversation specification, but the internal logic that implements the conversation may be defined by a composition. Users may define metrics on conversations to study how clients perceive the execution of the service. However, business users may define metrics on compositions to analyze the internal execution quality of a service.

It may be useful to analyze how external and internal quality are associated. To this end, the WSM of at least some embodiments allow the correlations of metrics defined for conversations with metrics defined for the compositions. For example, a metric associated with a conversation may be intended to compute whether a conversation (i.e., an interaction with a client) has met a stipulated SLA, and a metric associated to composition may be meant to measure an internal execution cost. Analysts may then be interested in correlating these two metrics to discover how the execution cost affects the ability to deliver the service in accordance with the stipulated SLA. In accordance with some embodiments, the WSM is programmed with knowledge of the formatting of the service execution logs data model. As such, the WSM may determine which composition instance (i.e., an execution of the composition) corresponds to which conversation instance (i.e., a certain message exchange with a client). Accordingly, the WSM may correlate metrics computed for a composition with measures computed for the conversations that these compositions supported.

The above discussion is meant to be illustrative of the principles and various embodiments of the present invention. Numerous variations and modifications will become apparent to those skilled in the art once the above disclosure is fully appreciated. For example, instead of presenting data via a web framework 332, the metrics information could be downloaded into a file and viewed on a software application, such as a spreadsheet. It is intended that the following claims be interpreted to embrace all such variations and modifications.

What is claimed is:

1. A method for monitoring performance of web-based services, the method comprising:
  receiving a transaction from a client;
  routing the transaction to an appropriate web service for execution of the transaction;
  executing the transaction;
  monitoring and logging transaction execution performance data relating to receiving and executing the transaction;
  reporting the performance data based on pre-defined performance metrics; and
  correlating the performance data to composition metric information to determine the relationship between execution of instances of the execution of composition and instances of execution of conversation in terms of the performance of the web service;

wherein receiving the transaction includes tracking, via a Simple Object Access Protocol ("SOAP") tracker, of information relating to the transaction;

wherein receiving the transaction includes communicating, via the SOAP tracker, the information to a web services manager (WSM) for performance analysis.

2. The method of claim 1, wherein the routing step is performed by a SOAP router or application server.

3. The method of claim 1, wherein the monitoring and logging step includes the use of a service registry and a service composition engine to record and store data in service execution logs relating to instances of conversation transaction or composition transaction.

4. The method of claim 1, wherein the reporting step includes extracting data from a service registry or the service execution logs for use by the WSM to generate performance reports.

5. The method of claim 1, wherein the reporting step is performed by the WSM.

6. The method of claim 5, wherein the WSM further includes a WSM definer, a metric schema and a WSM engine to generate performance reports.

7. The method of claim 6, wherein the WSM engine receives data from the SOAP tracker and data relating to conversation definitions, composition service definitions and related execution data.

8. The method of claim 5, wherein the WSM engine communicates with a web framework and related application servers to provide performance reports to business or IT personnel.

9. A system, comprising:
one or more processors;
memory coupled to the one or more processors, the memory storing executable instructions that when executed by the one or more processors, cause the one or more processors to:
track information relating to a transaction communicated from a client;
route the transaction to an appropriate web service for execution of the transaction;
collect performance data relating to the communication of the transaction from the client and the execution of the transaction by the web service;
extract the performance data and generate reports relating to the performance of the web services based on pre-defined performance metrics; and
correlate the performance data to composition metric information to determine the relationship between execution of instances of the execution of composition and instances of execution of conversation in terms of the performance of the web service;
wherein a Simple Object Access Protocol ("SOAP") tracker comprises a processor, out of the one or more processors, caused to track the information relating to the transaction communicated from the client.

10. A system as recited in claim 9, wherein the one or more processors receive tracking information relating to the transaction and communicates the information to a web services manager (WSM).

11. A system as recited in claim 9, further comprising a SOAP router or application server.

12. A system as recited in claim 9, wherein the one or more processors memorialize web service performance data in service execution logs.

13. A system as recited in claim 12, wherein the web service performance data in the service execution logs comprises data relating to instances of conversation transaction or composition transaction.

14. A system as recited in claim 9, further comprising a WSM.

15. A system as recited in claim 9, wherein the one or more processors receive data from a service registry or service execution logs and transmit the data to the WSM.

16. A system as recited in claim 15, wherein the WSM comprises a WSM definer, a metric schema and a WSM engine.

17. A system as recited in claim 16, wherein the WSM engine receives data from the SOAP tracker and data relating to conversation definitions, composition service definitions and related execution data.

18. A system as recited in claim 16, wherein the WSM engine communicates with a web framework and related application servers.

19. A method for creating custom metrics for monitoring performance of web-based services, the method comprising:
providing a metrics construction model;
providing a metrics library containing metrics definitions;
selecting at least one built-in metric function from the metrics library;
customizing the selected built-in metric function based on the metrics construction model by selecting parameters for the built-in metric function, wherein the metrics library is included in a web services manager ("WSM"); and
correlating the selected built-in metric function to conversation metric information to determine the relationship between execution of instances of the execution of composition and instances of execution of conversation in terms of the performance of the web-based service.

20. The method of claim 19, wherein the metrics construction model includes an algorithm for assembling the selected at least one metric function and the selected parameters into a custom metric.

21. A method for correlating conversation metrics to composition metrics to analyze performance of web-based services, the method comprising:
collecting information relating to at least one metric associated with a conversation;
collecting information relating to at least one metric associated with a composition; and
correlating the collected conversation metric information to the collected composition metric information to determine the relationship between execution of instances of the execution of the composition and instances of execution of the conversation in terms of the performance of the web-based service.

22. The method of claim 21, wherein conversation metric information is obtained from a service registry; and wherein composition metric information is obtained from a service composition engine.

23. A computer-readable non-transitory storage medium for storing an executable set of software instructions, wherein the instructions are configured for managing business-oriented web services by a method comprising:
transmitting a transaction from a client to an appropriate web service for execution of the transaction;
executing the transaction;
monitoring and logging, via a Simple Object Access Protocol ("SOAP") tracker, transaction execution performance data relating to transmitting and executing the transaction to a service execution log;

extracting the performance data from the service execution log;

parsing the performance data into a format readable by a web services manager;

correlating the performance data to composition metric information to determine the relationship between execution of instances of the execution of composition and instances of execution of conversation in terms of the performance of the web service; and compiling the performance data into a report.

24. The computer-readable non-transitory storage medium of claim 23, wherein the compiling step is coordinated by a web services manager.

* * * * *